United States Patent [19]

Gentile et al.

[11] Patent Number: 6,023,264
[45] Date of Patent: Feb. 8, 2000

[54] METHOD TO ESTIMATE THE WHITE POINT ON A DISPLAY DEVICE

[75] Inventors: Ronald S. Gentile, Atherton, Calif.; Ioana M. Danciu, Mercer Island, Wash.

[73] Assignee: Adobe Systems Incorporated, San Jose, Calif.

[21] Appl. No.: 09/066,080

[22] Filed: Apr. 24, 1998

[51] Int. Cl.[7] .................................................. G09G 5/10
[52] U.S. Cl. ................................. 345/147; 348/184
[58] Field of Search ............................... 345/22; 348/184; 355/32; 358/41, 80, 518; 364/571.01

[56] References Cited

U.S. PATENT DOCUMENTS

| | | | |
|---|---|---|---|
| 5,016,094 | 5/1991 | Kaneko et al. | 358/41 |
| 5,081,529 | 1/1992 | Collette | 358/80 |
| 5,172,224 | 12/1992 | Collette et al. | 358/80 |
| 5,313,291 | 5/1994 | Appel et al. | 358/501 |
| 5,334,992 | 8/1994 | Rochat et al. | 345/22 |
| 5,363,318 | 11/1994 | McCauley | 364/571.01 |
| 5,528,339 | 6/1996 | Buhr et al. | 355/32 |
| 5,583,666 | 12/1996 | Ellson et al. | 358/518 |
| 5,596,428 | 1/1997 | Tytgat et al. | 358/518 |
| 5,694,227 | 12/1997 | Starkweather | 358/504 |
| 5,754,222 | 5/1998 | Daly et al. | 348/184 |

OTHER PUBLICATIONS

Henry Kaug, "Color Technology for Electronic Imaging Devices," SPIE Press, 8 pgs. 1997.
Foley et al., "Chromatic Color," Addison Wesley, 578–585, 1992.
"Calibrating your Monitor," The Unofficial Spectator, 2 pgs. 1997.
"Monitor Calibration," Phototech Imaging, 3 pgs., downloaded from www. Jul. 15, 1998.
Brian Young, "Monitor Calibration," Sim Video Productions Ltd., 3 pgs. 1998.
"Monitor Calibration," North Hills Radio Club, Inc., 2 pgs. downloaded from www. Jul. 15, 1998.

*Primary Examiner*—Matthew Luu
*Assistant Examiner*—Jeff Piziali
*Attorney, Agent, or Firm*—Fish & Richardson P.C.

[57] ABSTRACT

A method for estimating a white point includes displaying a plurality of grey patches on a screen; requesting that a user select a patch corresponding to a neutral grey; and iteratively converging to a patch where the estimated white point is the most neutral grey point.

21 Claims, 4 Drawing Sheets

METHOD TO ESTIMATE THE WHITE POINT ON A DISPLAY DEVICE

BACKGROUND

The present invention relates to the field of digital image processing, and more particularly to color calibration and color enhancement for digital imaging systems.

Continual advances in computer technology are making possible cost effective color digital imaging systems capable of displaying high resolution images. The proliferation of these imaging systems is driving a need for predictable color matching between the image scanner, the display, and the hard copy devices. In color digital imaging, each aspect of the imaging chain, including the lighting of the original scene as well as the capturing, storage, transmission, and display of the image on screen or hard copy devices, generally involves different color spaces in conjunction with different color gamuts. Most of the color spaces are device dependent. A color gamut is the range of colors which can be reproduced on a particular device. In this context, accurate descriptions of how various devices in a typical work flow represent color are required.

One method to ensure consistent color characteristics is to calibrate the color display and hard copy devices to particular set up parameters. A description of a device with respect to the way it represents color is stored in a "profile" of that device. Based on the type of the device, certain parameters are required in order to completely and accurately characterize the device.

For example, in the case of display devices, these parameters include the X, Y, and Z coordinates of the media white point; the relative X, Y, Z values corresponding to red, green and blue; and the red, green and blue tone reproduction curves. The XYZ values are the three standard primary colors of the CIE chromaticity diagram. Once all devices involved in a particular work flow are appropriately characterized by the corresponding profiles, color management systems can be used to convert colors from the color space of one device to the color space of another device, therefore leading to consistent color reproduction across the devices as well as operating system platforms.

Several products are currently available for accurately measuring the characteristics of various display and hard copy devices. With the aid of such tools, the user can display an image having known color characteristics and manually calibrate the display screen to produce known characteristics of the image on a display screen or on a hard copy device. However, since most computer users do not have access to relatively expensive measurement and calibration equipment, these users generally resort to an alternate solution of using a software tool in conjunction with a physical template whose brightness and hue are compared and matched to that of the display. However, the use of the matching template is not optimal as the screen and the template are made from different media (emissive versus reflective). Additionally, software tools in this category require that a template be readily available for comparison purposes.

SUMMARY OF THE INVENTION

A method for estimating a white point includes displaying a plurality of grey patches on a screen; requesting that a user select a patch corresponding to a neutral grey; and iteratively converging to a patch where the estimated white point is the most neutral grey point.

Implementations of the invention may include the initializing gamma and phosphor values. Moreover, each grey patch may be associated with an index, and the index is incremented or decremented in accordance with a user selection.

The parameter initialization may include dividing the white point's axis into n samples whose corresponding correlated color temperatures range between 4500° K and 10000° K; setting a gamma value to the display's gamma value; setting phosphor values to the display's phosphor values; setting a current sample to a point where the correlated temperature of 6500° K; and setting the current index to the index of a current sample.

Moreover, implementations of the invention may include generating red green blue (RGB) coordinates of each grey patch corresponding to n sample white points. The RGB coordinate computing step may include assuming a white point corresponds to the i-th sample; generating a reference XYZ vector using a 7500° K correlated color temperature; computing an XYZ-to-RGB transformation matrix based on the current white point and phosphor setting; applying the XYZ-to-RGB transformation to the referenced XYZ vector; using the current gamma values, correct the gamma values of a reference RGB vector; and, mapping the RGB values to a color range. The RGB mapping step may map from a 0 . . . 1 range to a 0 . . . 255 range.

Further, if a white point chromaticity is denoted ($w_x$, $w_y$), values for red, green and blue phosphors are denoted as ($r_x$, $r_y$), ($g_x$, $g_y$) and ($b_x$, $b_y$), Z values generated as 1−X−Y, and a matrix W is denoted $\underline{W}$; implementations of the invention may include computing the following:

$$\underline{W} = [X_w Y_w Z_w] = \left[ \frac{w_x}{w_y} \quad 1 \quad \frac{w_z}{w_y} \right];$$

$$\underline{K} = \begin{pmatrix} r_x & r_y & r_z \\ g_x & g_y & g_z \\ b_x & b_y & b_z \end{pmatrix};$$

$$\underline{V} = \underline{W} * \underline{K}^{-1};$$

$$\underline{V} = [V_r V_g V_b];$$

$$\underline{G} = \begin{pmatrix} V_r & 0 & 0 \\ 0 & V_g & 0 \\ 0 & 0 & V_b \end{pmatrix};$$

$$\underline{N} = \underline{G} * \underline{K};$$

$$\underline{M} = \underline{N}^{-1}; \text{ and}$$

converting a 7500° K scaled reference XYZ vector into its respective $\underline{C}_{RGB(7500)}$ using:

$$\underline{C}_{RGB(7500)} = \underline{C}_{XYZ(7500)} * M$$

Implementations of the invention may also include scaling a reference XYZ vector corresponding to a 7500° K correlated color temperature such that y=0.5. Further, the invention may include turning off light sources shining on the screen; and displaying the grey patches on a black background.

Advantages of the invention include the following. The invention provides color calibration less expensively than color measuring equipment. Moreover, the invention is a software tool that does not require any special hardware besides the computer itself. Physical templates are not needed. The invention also obviates the need for matching colors in different media. The invention also does not require detailed knowledge of color science in order to perform color calibration.

DESCRIPTION

Figure 1:
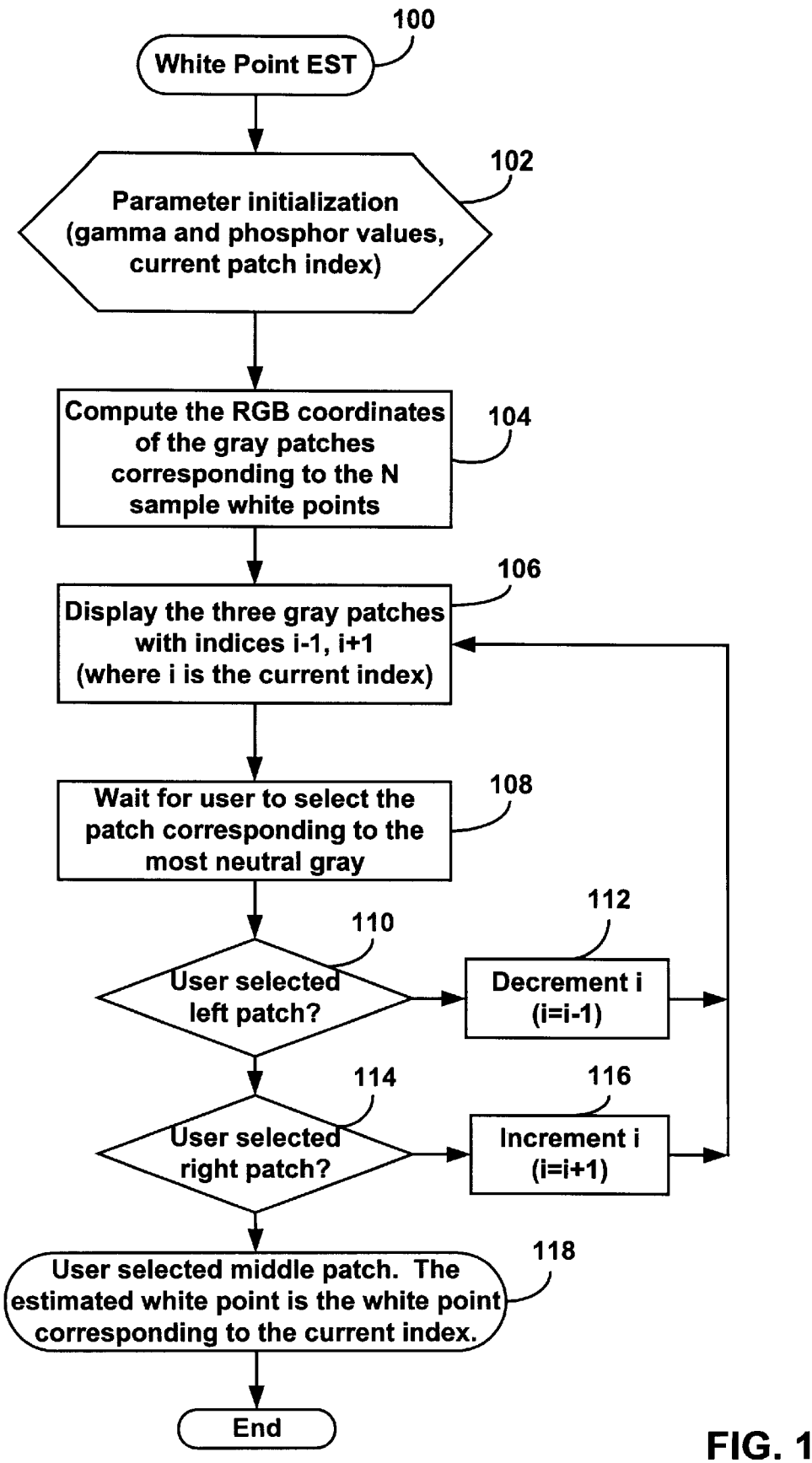
FIG. 1 is a flow chart of a white point estimation process.

Referring now to FIG. 1, a white point estimation process 100 is shown. First, the process 100 initializes gamma and phosphor values as well as a current patch index (step 102). Next, the process 100 computes RGB coordinates of the grey patches corresponding to the n sample white points (step 104). Next, the process 100 displays three grey patches with indices 1−1, i, i+1, where i is the current index (step 106). The grey patches are displayed on a completely black background in the absence of any light sources shining on the screen. The process 100 then waits for a user to select the patch corresponding to the most neutral grey color (step 108).

Next, the process 100 determines whether the user has selected a left patch (step 110). If so, the current index i is decremented (step 112) and the process loops back to step 106. Alternatively, in the event that the user did not select the left patch, the process 100 determines whether the user has selected a right patch (step 114). If so, the current index i is incremented (step 116) before the process 100 loops back to step 106. Alternatively, in the event the user selected neither the left nor the right patch, the process 100 proceeds to step 118 to handle the condition that the user has selected a middle patch. The estimated white point is the white point corresponding to the current index. Finally, the process 100 exits (step 120).

Figure 2:
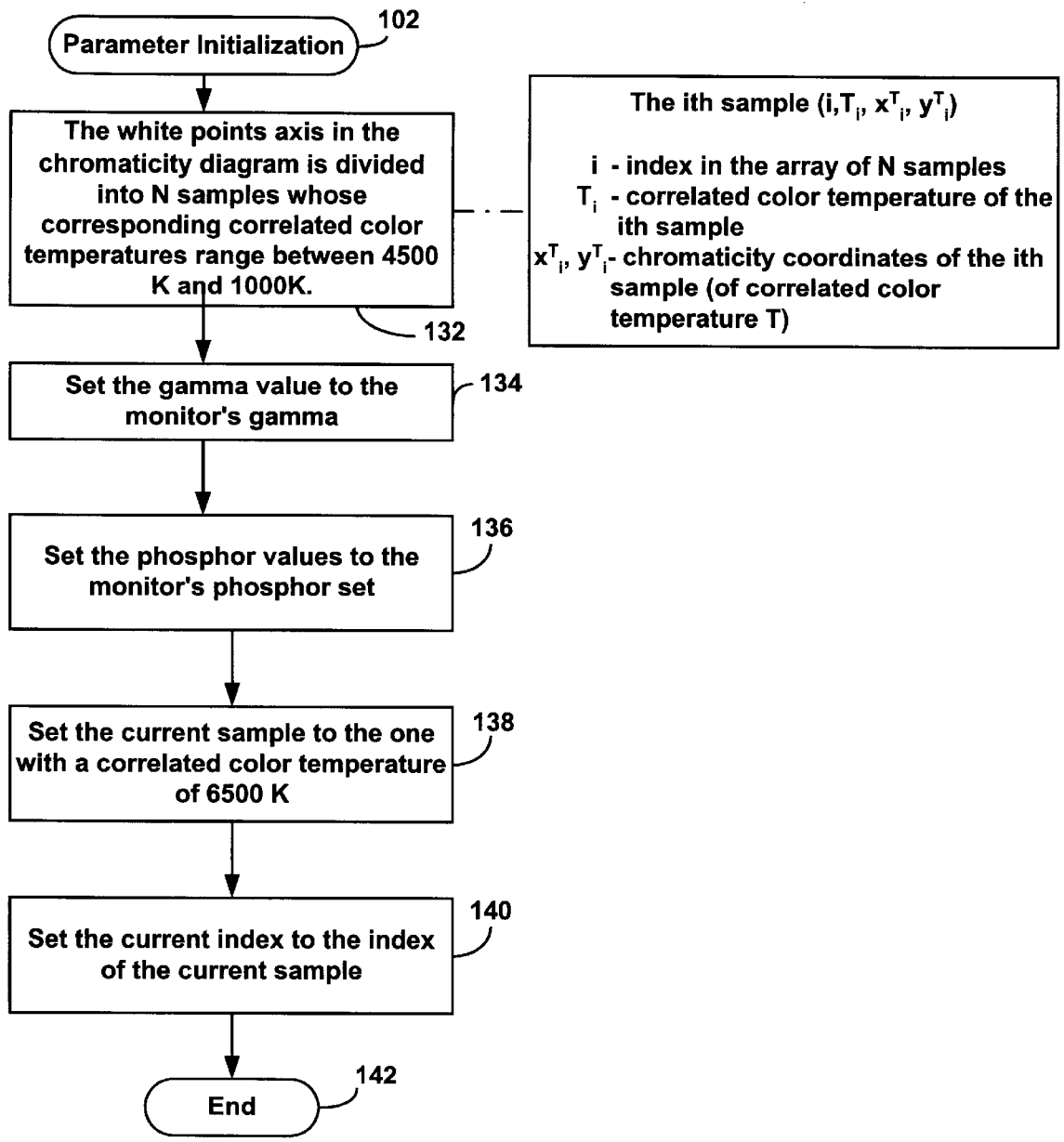
FIG. 2 is a flow chart of a parameter initialization process.

Turning now to FIG. 2, the parameter initialization process associated with step 102 is shown in more detail. The process divides the white point axis in the chromaticity diagram into n samples whose corresponding correlated color temperatures range between 4,500° K and 10,000° K (step 132). Each sample is therefore associated with an index pointing to the array of n samples, a correlated color temperature $T_i$ of the i-th sample, a set of chromaticity coordinates $(x_i^T, y_i^T)$ of the i-th sample at the correlated temperature $T_i$.

Next, the process sets a gamma parameter to the monitor gamma value (step 134). Then, the phosphor values are set to the monitor phosphor values (step 136). The process sets the current sample to the sample with a correlated color temperature of 6,500° K (step 138). The index is then set to the index of the current sample (step 140) before the process exits (step 142).

Figure 3:
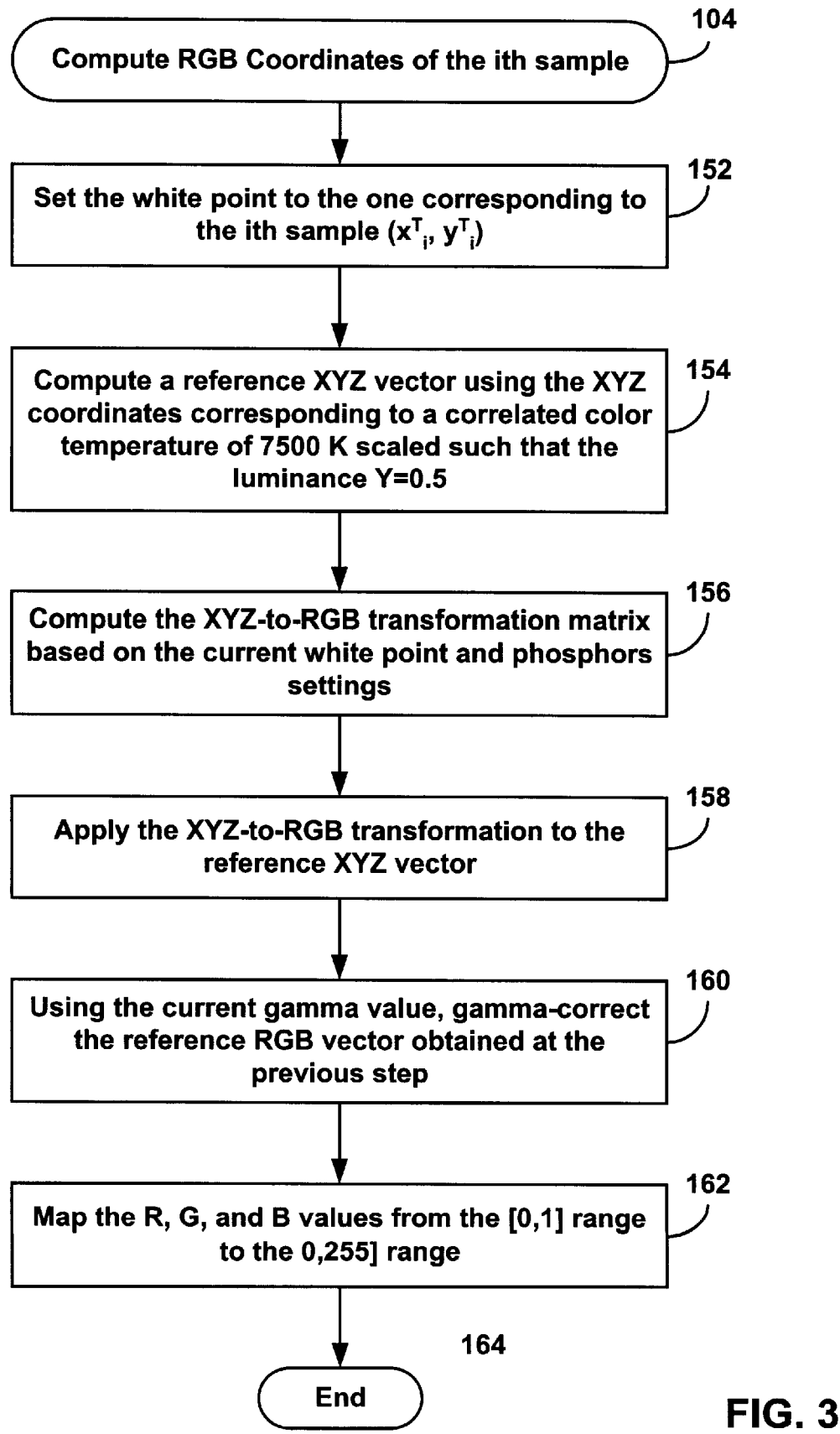
FIG. 3 is a flow chart of an RGB coordinate determination process.

Referring now to FIG. 3, a process for determining the RGB coordinates of step 104 is shown in more detail. First, the process sets the white point to the point corresponding to the i-th sample $(x_i^t, y_i^t)$ (step 152). Next, the process computes a reference XYZ vector using the XYZ coordinates corresponding to the correlated color temperature of 7500° K scaled such that luminance value Y is set for 0.5 (step 154). For example, if the reference XYZ vector has the following values: $X_r$=0.9495; $Y_r$=1.0; and $Z_r$=1.2251, the scaled reference XYZ vector is: $X_r$=0.47475; $Y_r$=0.5; and $Z_r$=0.61255.

Then, the process computes the XYZ-to-RGB transformation matrix based on the current white point and phosphor settings (step 156). In the XYZ to RGB transformation matrix, the white point chromaticity is denoted ($w_x$, $w_y$), while the red, green and blue phosphors are denoted as ($r_x$, $r_y$), ($g_x$, $g_y$) and ($b_x$, $b_y$). The values may be derived by using the equation $$Z=1-X-Y.$$

Next, the following operations are performed:

$$\underline{W} = [X_w Y_w Z_w] = \begin{bmatrix} \frac{w_x}{w_y} & 1 & \frac{w_z}{w_y} \end{bmatrix};$$

$$\underline{K} = \begin{pmatrix} r_x & r_y & r_z \\ g_x & g_y & g_z \\ b_x & b_y & b_z \end{pmatrix}$$

$$\underline{V} = \underline{W} * \underline{K}^{-1}$$

$$\underline{V} = [V_r V_g V_b]$$

$$\underline{G} = \begin{pmatrix} V_r & 0 & 0 \\ 0 & V_g & 0 \\ 0 & 0 & V_b \end{pmatrix}$$

$$\underline{N} = \underline{G} * \underline{K}; \text{ and}$$

$$\underline{M} = \underline{N}^{-1};$$

Then, the 7500° K scaled reference XYZ vector is converted into its respective $\underline{C}_{RGB(7500)}$ using:

$$\underline{C}_{RGB(7500)} = \underline{C}_{XYZ(7500)} * M$$

The process of FIG. 3 applies the XYZ-to-RGB transformation to the reference $XYZ_{7500}$ vector (step 158).

$$C_{XYZ} = [X_r Y_r Z_r]$$

$$\underline{C}_{RGB} = \underline{C}_{XYZ} * M$$

Then, using the current gamma value γ, the process of FIG. 3 corrects the gamma of the reference RGB vector obtained in step 158 (step 160).

$$\underline{C}'_{RGB} = \underline{C}_{RGB}{}^{1/65}$$

The process of FIG. 3 maps the RGB values from the 0 . . . 1 range to the 0 . . . 255 range (step 162) using:

$$\underline{C}''_{RGB} = (\underline{C}'_{RGB} * 255.0) + 0.5$$

The integer portion of $\underline{C}''_{RGB}$ is used. Finally, the process exits (step 164).

The techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

Figure 4:
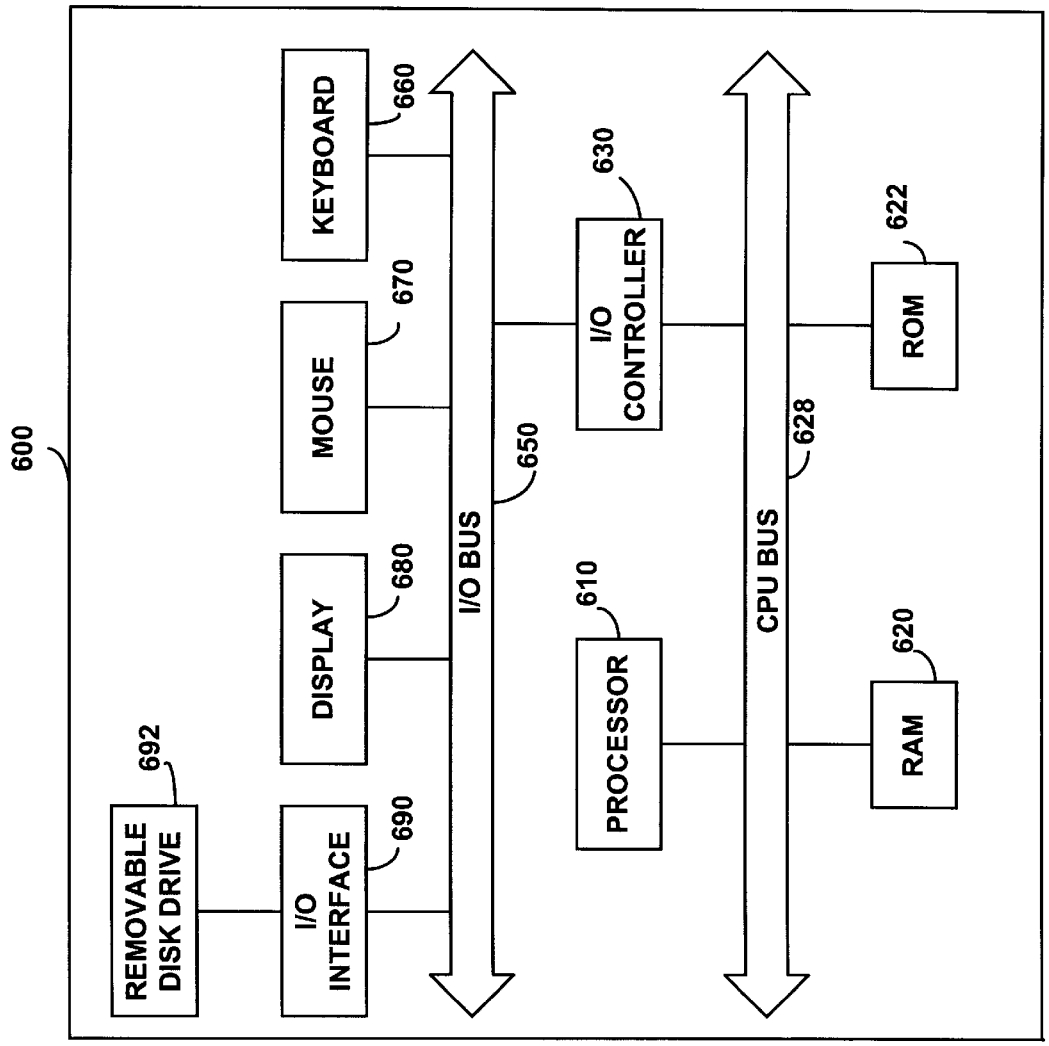
FIG. 4 is an illustration of a computer system.

FIG. 4 illustrates one such computer system 600, including a CPU 610, a RAM 620, a ROM 622 and an I/O controller 630 coupled by a CPU bus 698. The I/O controller 630 is also coupled by an I/O bus 650 to input devices such as a keyboard 660 and a mouse 670, and output devices such as a monitor 680. The I/O controller 630 also drives an I/O interface 690 which in turn controls a removable disk drive 692 such as a floppy disk, among others.

Variations are within the scope of the following claims. For example, instead of using a mouse as the input devices to the computer system 600, a pressure-sensitive pen or tablet may be used to generate the cursor position information. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

While the invention has been shown and described with reference to an embodiment thereof, those skilled in the art will understand that the above and other changes in form and detail may be made without departing from the spirit and scope of the following claims.

What is claimed is:

1. A method for estimating a white point, comprising:
    displaying a plurality of grey patches on a display screen of a display device, wherein each patch is associated with an index for estimating a color temperature of the white point;
    applying a divided white point chromaticity axis to provide a constant luminance and a variable chromaticity for each patch;
    requesting that a user select one of the plurality of grey patches having a neutral grey color;
    adjusting the indices of the displayed grey patches according to the user selection; and
    iterating the steps of displaying gray patches and requesting user selection to converge to a grey patch where the estimated white point is the most neutral grey point.

2. The method of claim 1, further comprising initializing gamma and phosphor values.

3. The method of claim 1, further comprising:
    dividing the white point chromaticity axis into n samples whose corresponding correlated color temperatures range between 4500° K and 10000° K;
    setting a gamma value to the display's gamma value;
    setting phosphor values to the display's phosphor values;
    setting a current sample to a point where the correlated temperature is 6500° K; and
    displaying a current grey patch according to the gamma and phosphor values and the current sample.

4. The method of claim 1, further comprising computing red green blue (RGB) coordinates of a grey patch corresponding to one of n sample white points on a chromaticity diagram.

5. The method of claim 4, wherein computing RGB coordinates of a grey patch comprises:
    initializing gamma and phosphor setting values;
    assuming a white point corresponds to an i-th sample of n sample white points on a chromaticity diagram;
    generating a reference XYZ vector using 7500° K correlated color temperature;
    computing an XYZ-to-RGB transformation matrix based on a current white point and phosphor setting;
    applying the XYZ-to-RGB transformation to the reference XYZ vector;
    using current gamma values, correcting the gamma values of a reference RGB vector; and
    mapping the RGB values to a color range.

6. The method of claim 5, wherein the RGB mapping step maps from a 0 . . . 1 range to a 0 . . . 255 range of integers.

7. The method of claim 4, wherein a white point chromaticity is denoted ($w_x$, $w_y$), values for red, green and blue phosphors are denoted as ($r_x$, $r_y$), ($g_x$, $g_y$) and ($b_x$, $b_y$), and Z has a value 1−X−Y, the method further comprising:

$$\text{determining } \underline{W} = [X_w Y_w Z_w] = \left[\frac{w_x}{w_y} \quad 1 \quad \frac{w_z}{w_y}\right];$$

$$\text{determining } \underline{K} = \begin{pmatrix} r_x & r_y & r_z \\ g_x & g_y & g_z \\ b_x & b_y & b_z \end{pmatrix};$$

$$\text{determining } \underline{V} = \underline{W} * \underline{K}^{-1};$$

$$\text{determining } \underline{V} = [V_r V_g V_b];$$

$$\text{determining } \underline{G} = \begin{pmatrix} V_r & 0 & 0 \\ 0 & V_g & 0 \\ 0 & 0 & V_b \end{pmatrix};$$

$$\text{determining } \underline{N} = \underline{G} * \underline{K};$$

$$\text{determining } \underline{M} = \underline{N}^{-1}; \text{ and}$$

converting a 7500° K scaled reference XYZ vector $$\underline{C}_{RGB(7500)} = \underline{C}_{XYZ(7500)} * M.$$

$\underline{C}_{XYZ}$ into a vector of RGB coordinates $\underline{C}_{RGB}$ in accordance with $\underline{C}_{RGB} = \underline{C}_{XYZ} * M$.

8. The method of claim 1, further comprising scaling a reference XYZ vector corresponding to a 7500° K correlated color temperature such that y=0.5.

9. The method of claim 1, wherein the grey patches are displayed on a black background in the absence of light shining on the screen to estimate the color temperature of the white point.

10. A computer program stored on a computer-readable media for estimating a white point, the program comprising instructions to:
    display a plurality of grey patches on a display screen of a display device, wherein each patch is associated with an index for estimating a color temperature of the white point;
    apply a divided white point chromaticity axis to provide a constant luminance and a variable chromaticity for each patch;
    request that a user select one of the plurality of grey patches having a neutral grey color;
    adjust the indices of the displayed grey patches according to the user selection; and
    iterate the steps of displaying gray patches and requesting user selection to converge to a grey patch where the estimated white point is the most neutral grey point.

11. The program of claim 10, further comprising instructions to initialize gamma and phosphor values.

12. The program of claim 10, wherein the parameter initialization step further comprises instructions to:

divide the white point chromaticity axis into n samples whose corresponding correlated color temperatures range between 4500° K and 10000° K;

set a gamma value to the display's gamma value;

set phosphor values to the display's phosphor values;

set a current sample to a point where the correlated temperature is 6500° K; and display a current grey patch according to the gamma and phosphor values and the current sample.

13. The program of claim 10, further comprising instructions to compute red green blue (RGB) coordinates of each grey patch corresponding to one of n sample white points on a chromaticity diagram.

14. The program of claim 13, wherein the RGB coordinate computing instructions further comprises instructions to:

initialize gamma values and phosphor settings;

assume a white point corresponds to an i-th sample of n sample white points on a chromaticity diagram;

generate a reference XYZ vector using a 7500° K correlated color temperature;

compute an XYZ-to-RGB transformation matrix based on the current white point and phosphor setting;

apply the XYZ-to-RGB transformation to the referenced XYZ vector;

use the current gamma values, correct the gamma values of a reference RGS vector; and map the RGB values to a color range.

15. The program of claim 14, wherein the RGB mapping instructions map from a 0 . . . 1 range to a 0 . . . 255 range of integers.

16. The program of claim 13, wherein a white point chromaticity is denoted $(w_x, w_y)$, values for red, green and blue phosphors are denoted as $(r_x, r_y)$, $(g_x, g_y)$ and $(b_x, b_y)$ and Z has a value 1−X−Y, the method further comprising instructions to:

$$\text{determine } \underline{W} = [X_w Y_w Z_w] = \begin{bmatrix} \frac{w_x}{w_y} & 1 & \frac{w_z}{w_y} \end{bmatrix};$$

-continued $$\text{determine } \underline{K} = \begin{pmatrix} r_x & r_y & r_z \\ g_x & g_y & g_z \\ b_x & b_y & b_z \end{pmatrix};$$

$$\text{determine } \underline{V} = \underline{W} * \underline{K}^{-1};$$

$$\text{determine } \underline{V} = [V_r V_g V_b];$$

$$\text{determine } \underline{G} = \begin{pmatrix} V_r & 0 & 0 \\ 0 & V_g & 0 \\ 0 & 0 & V_b \end{pmatrix};$$

$$\text{determine } \underline{N} = \underline{G} * \underline{K};$$

$$\text{determine } \underline{M} = \underline{N}^{-1}; \text{ and}$$

convert a 7500° K scaled reference XYZ vector $\underline{C}_{XYZ}$ into a vector of RGB coordinates $C_{RGB}$ in accordance with $C_{RGB}=C_{XYZ}*M$.

17. The program of claim 10, further comprising instructions to scale a reference XYZ vector corresponding to a 7500° K correlated color temperature such that y=0.5.

18. The method of claim 10, wherein the grey patches are displayed on a black background in the absence of light shining on the screen to estimate the color temperature of the white point.

19. The method of claim 5, further comprising:

scaling the XYZ reference vector to have a luminance value between zero and one.

20. The program of claim 14, further comprising instructions to:

scale the XYZ reference vector to have a luminance value between zero and one.

21. The method of claim 1, wherein the white point estimate coordinates are XYZ values in a CIE chromaticity diagram.

* * * * *